FREQUENCY-MODULATED RECEIVER WITH DECREASED THRESHOLD LEVEL

Filed Feb. 17, 1966 3 Sheets-Sheet 1

United States Patent Office 3,544,899
Patented Dec. 1, 1970

3,544,899
FREQUENCY-MODULATED RECEIVER WITH DECREASED THRESHOLD LEVEL

Igor Alexandrovich Gusyatinsky, 1 Kolobovsky pereulok 13, kv. 10, and Jury Nosonovich Margolin, Ul. Zhigulevskaya 19, korpus 1, kv. 30, both of Moscow, U.S.S.R.

Filed Feb. 17, 1966, Ser. No. 528,216
Int. Cl. H03c 3/06
U.S. Cl. 325—346 3 Claims

ABSTRACT OF THE DISCLOSURE

Frequency-modulated receivers with decreased threshold level. To decrease the threshold level the invention employs a filtering of a highly compressed frequency-modulated signal in an auxiliary narrow-band intermediate-frequency amplifier. In order to compress the frequency-modulated signal use is made of a negative feedback frequency circuit whereas in order to recover the initial frequency deviation of the frequency-modulated signal and to increase the stability of operation of the frequency-modulated receiver, use is made of a positive feedback frequency circuit.

The present invention relates to frequency-modulated receivers. More particularly, the invention relates to frequency-modulated receivers with a reduced threshold level.

The known frequency-modulated receivers employ negative frequency feedback for decreasing the threshold level. The negative feedback is fed from the discriminator output through a frequency-modulated local oscillator to an auxiliary mixer and comprises an intermediate-frequency amplifier and the discriminator of the receiver.

The disadvantages of the known frequency-modulated negative-feedback receivers are that at certain frequencies the negative feedback is transformed into the positive feedback due to phase shift in the feedback loop which causes self-excitation. Therefore, to obtain stability of the network, the frequency and phase responses of the feedback loop must be adequately compensated leading to complications in tuning and utilization of negative feedback.

The degree of feedback in the negative feedback receiver is established so that the frequency deviation in the local oscillator is somewhat lower than that in the signal being received. This modulation must be in phase with the modulation of the received signal. An intermediate frequency signal appears due to the interaction between the received signal and the signal of the frequency-modulated local oscillator in the auxiliary mixer, the frequency deviation of this signal being lower than that of the received signal. The decrease in deviation causes a decrease in the spectrum bandwidth of the frequency-modulated intermediate-frequency signal. Therefore the passband of the intermediate-frequency amplifier can be narrowed thereby decreasing the receiver threshold level.

As is known, the negative feedback always causes a wider passband of the said channel. Hence, the equivalent noise passband is always wider than that of the narrow-band intermediate-frequency amplifier.

As a result, the negative frequency feedback does not ensure the threshold point gain which could be expected from the narrowed passband of the intermediate-frequency amplifier.

It should be pointed out that in addition to the useful intelligence the frequency-modulated local oscillator is also modulated with noise coming from the output of the receiver discriminator. With very strong feedback, the noise in the main channel sharply increases, i.e. an intrinsic threshold is created in the negative frequency feedback network. Therefore the feedback degree of the receiver can be increased to a certain value only, and this also prevents complete use of the threshold level gain.

Due to nonlinearity of the modulation characteristic of the frequency-modulated local oscillator the intelligence being transmitted is distorted.

It is an object of the present invention to develop a frequency-modulated receiver with decreased threshold level which will be stable at maximum compression of the spectrum.

It is another object of the invention to develop a frequency-modulated receiver whose threshold level will be determined only by the narrowed passband of the intermediate-frequency amplifier.

It is still another object of the invention to develop a frequency-modulated receiver in which the signal level at the discriminator output is independent of the degree of feedback.

It is a still further object of the invention to develop a frequency-modulated receiver in which the non-linearity of the modulation characteristics of the frequency-modulated local oscillator produces a negligible effect on the distortions of the transmitted intelligence.

The concept of the invention is embodied in a frequency-modulated receiver employing a double-loop frequency feedback which consists of an outer loop for providing negative feedback to decrease frequency deviation, and an inner loop for ensuring positive feedback to recover the initial frequency deviation.

To ensure a double-loop feedback in the receiver, it is preferred to employ an auxiliary narrow-band intermediate-frequency amplifier, which is placed behind the main intermediate-frequency amplifier, and two auxiliary mixers, one being connected between the main and auxiliary intermediate-frequency amplifiers, and the other between the auxiliary intermediate-frequency amplifier and the receiver discriminator, the outer negative feedback loop being connected to the first mixer and comprising the intermediate-frequency amplifier and the discriminator through the frequency-modulated local oscillator, while the inner feedback loop comprises the second mixer through the frequency-modulated local oscillator of the receiver.

The double-loop feedback can be provided by an additional narrow-band intermediate-frequency amplifier placed after the main intermediate-frequency amplifier, a non-modulated local oscillator and three auxiliary mixers, one of which is connected between the main and auxiliary amplifiers, the second is inserted between the auxiliary intermediate-frequency amplifier and the discriminator, and the third mixer is connected to the output of the non-modulated local oscillator, the outer negative feedback loop being connected to the first mixer from the output of the second mixer through the third mixer, and the inner positive feedback loop comprising the second mixer and the third mixer.

It is also preferred to use a phase detector connected to the outputs of the additional narrow-band intermediate-frequency amplifier and auxiliary local oscillator.

Other objects and advantages of the invention will be made clear from the following description of exemplary embodiments thereof when read in conjunction with the accompanying drawing, wherein.

Figure 1:
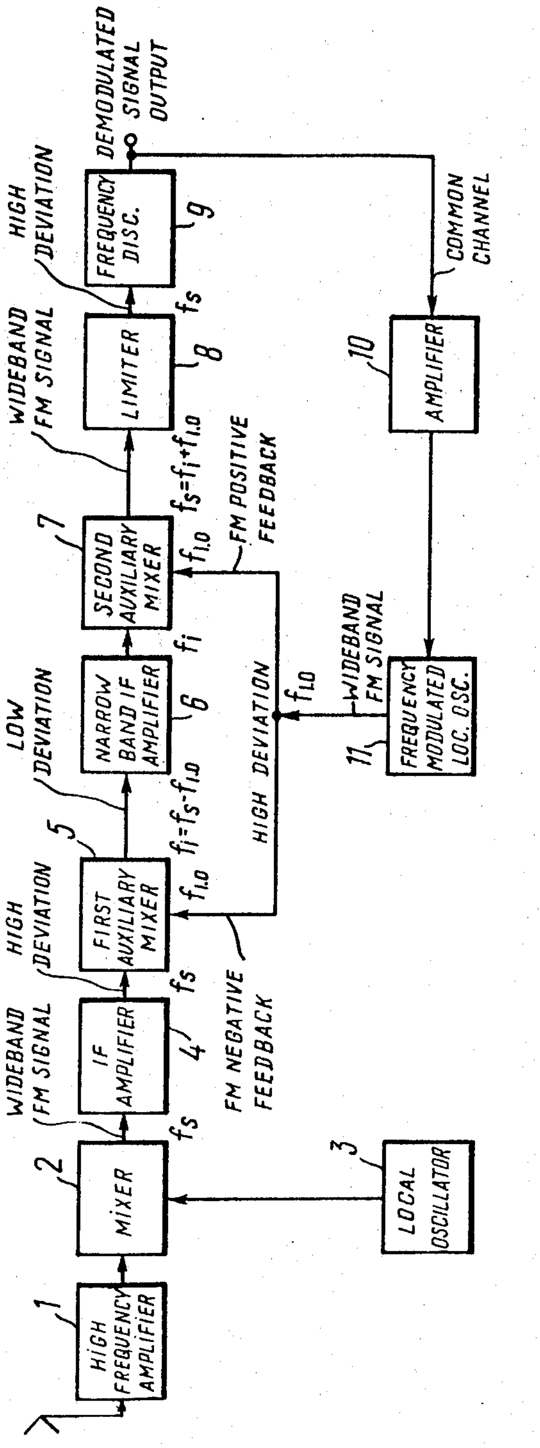
FIG. 1 is a block diagram of the frequency-modulated receiver with double-loop feedback for demodulated signal, according to the invention.

The frequency-modulated receiver comprises a high-frequency amplifier 1 from which high-frequency modulated oscillations are fed to a mixer 2 which also receives signals from local oscillator 3. Intermediate-frequency oscillations obtained in mixer 2 are amplified in main intermediate-frequency amplifier 4 having a wide passband which is selected considering the width of the frequency-modulated oscillation spectrum at the receiver input. The frequency-modulated oscillations are further passed through first auxiliary mixer 5 to auxiliary narrow-band intermediate-frequency amplifier 6, then to second auxiliary mixer 7 and, through limiter 8, to frequency discriminator 9.

The passband of auxiliary narrow-band intermediate-frequency amplifier 6 corresponds to the spectrum of frequency-modulated signal with decreased frequency deviation and is equal to twice the maximum modulation frequency.

The demodulated signal is fed from the output of discriminator 9 through demodulated signal amplifier 10 to frequency-modulated local oscillator 11 wherein it is modulated. The output of frequency-modulated local oscillator 11 is connected to the inputs of auxiliary mixers 5 and 7 thereby providing a double-loop feedback.

The outer loop comprising mixers 5, 7, auxiliary intermediate-frequency amplifier 6 and discriminator 9 with limiter 8 demodulated signal amplifier 10 and frequency-modulated local oscillator 11 provides for negative feedback, while the inner loop made up of second mixer 7, discriminator 9 with limiter 8, demodulated signal amplifier 10 and frequency-modulated local oscillator 11 effects positive feedback.

The decrease in the frequency-modulated signal spectrum bandwidth in a double-loop feedback receiver is obtained as follows.

An intermediate-frequency signal ($f_i$) is produced in mixer 5, having a frequency equal to the difference of input signal frequency $f_s$ and that of the signal $f_{1.o}$ from frequency-modulated local oscillator 11, i.e.

$$f_i = f_s - f_{1.o}$$

Now the signal with intermediate frequency $f_i$ interacts with the local oscillator signal having frequency $f_{1.o}$ in mixer 7. As a result the signal with initial frequency $f_s$ is set up again.

$$f_s = f_i + f_{1.o}$$

A sum-frequency signal can be obtained in mixer 5 and a difference-frequency signal, in mixer 7. Selection of the method of conversion and frequency $f_{1.o}$ of the frequency-modulated local oscillator for a particular receiver is determined by the minimum of spurious oscillations in frequency conversion, i.e. higher harmonics and combination frequencies.

When the input signal has a modulated frequency deviation $\Delta f_s$ and the feedback degree is selected so that a frequency deviation of the frequency-modulated local oscillator is equal to $\Delta f_{1.o}$, the frequency of the output signal of mixer 5 will be defined from the equation:

$$f_s + \Delta f_s - (f_{1.o} + \Delta f_{1.o}) = f_i + \Delta f_i$$

where $\Delta f_i = \Delta f_s - \Delta f_{1.o}$.

The frequency of the output signal of mixer 7 will be derived from the equation:

$$f_i + \Delta f_i + (f_{1.o} + \Delta f_{1.o}) = f_s + \Delta f_i + \Delta f_{1.o} = f_s + \Delta f_s$$

It follows from the above equations that the frequency deviation is decreased in first auxiliary mixer 5 while in second mixer 7 the initial frequency deviation is recovered.

In this way negative frequency feedback comprises mixer 5 and positive frequency feedback mixer 7. As a result, the common channel is free from any frequency feedback and the circuit of said receiver is less liable to self-excitation than the known receiver circuits using a single-loop frequency feedback.

It should be pointed out that full neutralization of negative feedback cannot be obtained beyond the passband of the narrow-band intermediate-frequency amplifier since here the envelope phase is inverted; therefore the conditions for frequency conversion are not identical in mixers 5 and 7.

This inversion, however, is actually not very great and approaches 90° when a single tuned circuit or two coupled circuits are employed. Moreover, these frequencies are already attenuated substantially in the narrow-band intermediate-frequency amplifier and may be attenuated more by the filter provided at the discriminator output so that the receiver using double-loop feedback is not excited even with strong feedback.

Figure 2:
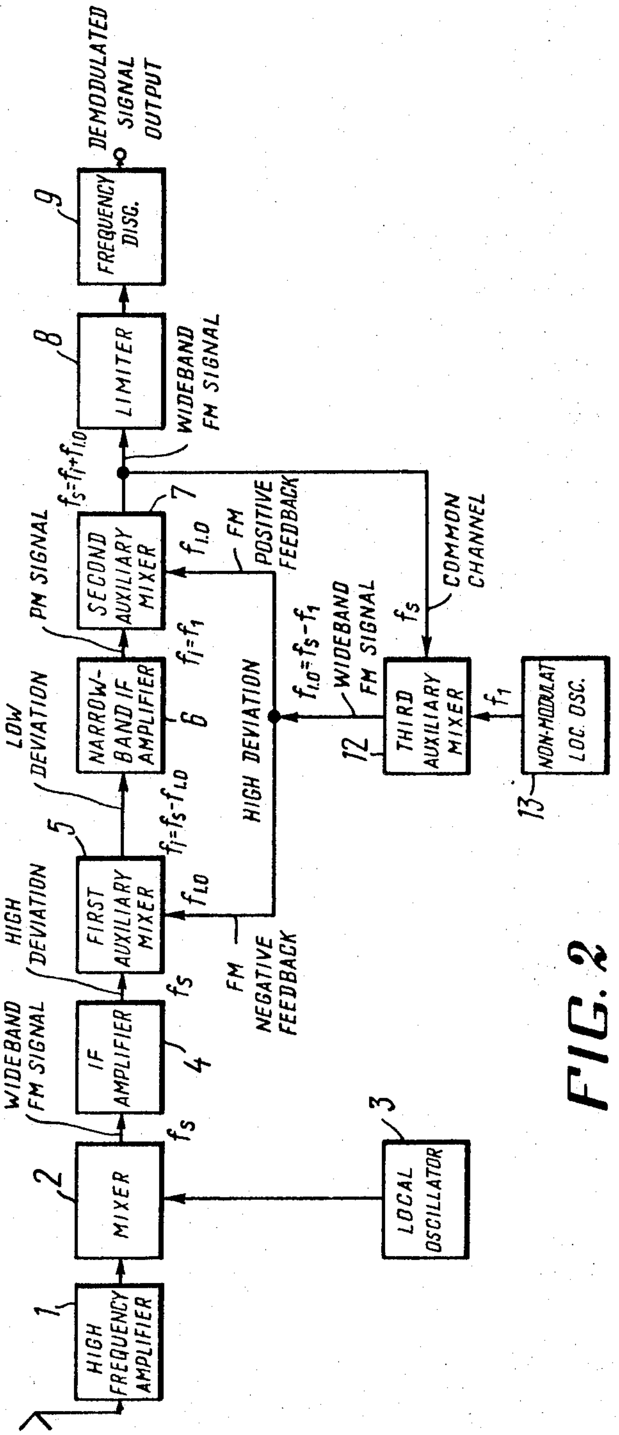
FIG. 2 is a block diagram of the frequency-modulated receiver with double-loop feedback for an intermediate signal, according to the invention.

FIG. 2 shows another embodiment of the invention in which the frequency-modulated receiver uses a third auxiliary mixer 12 to obtain a frequency-modulated signal with frequency $f_{1.o}$. This frequency is obtained by mixing the output signal at frequency $f_s$ with the signal of non-modulated local oscillator 13 at frequency $f_1$. The signal carrier frequency in narrow-band intermediate-frequency amplifier 6 is determined by the signal frequency of non-modulated local oscillator 13. The frequency deviation fed from mixer 12 to mixer 5 is always equal to the frequency deviation of the received signal. Therefore, in the receiver illustrated in FIG. 2 maximum compression of the frequency spectrum takes place automatically in mixer 5.

Non-modulated local oscillator 13 can be stabilized, which provides for high stability of the signal frequency in narrow-band intermediate-frequency amplifier 6 even in case of non-stable frequency of the received signal.

It should be pointed out that the frequency deviations are not fully subtracted in mixer 5 though a 100 percent degree of feedback is automatically maintained. This results from the fact that the signals in the feedback loop are lagging and the output signal frequency has a certain time shift with respect to the frequency of the signal supplied to mixer 5 from mixer 12. Therefore frequency deviations are not fully subtracted in mixer 5, the signals of higher modulating frequencies being more shifted and causing a greater deviation in mixer 5 after frequency conversion. In practice the value of this lagging in the feedback loop should be selected so as to provide considerable decrease in deviation, i.e. extreme compression of spectrum, for the highest modulating frequencies.

Figure 3:
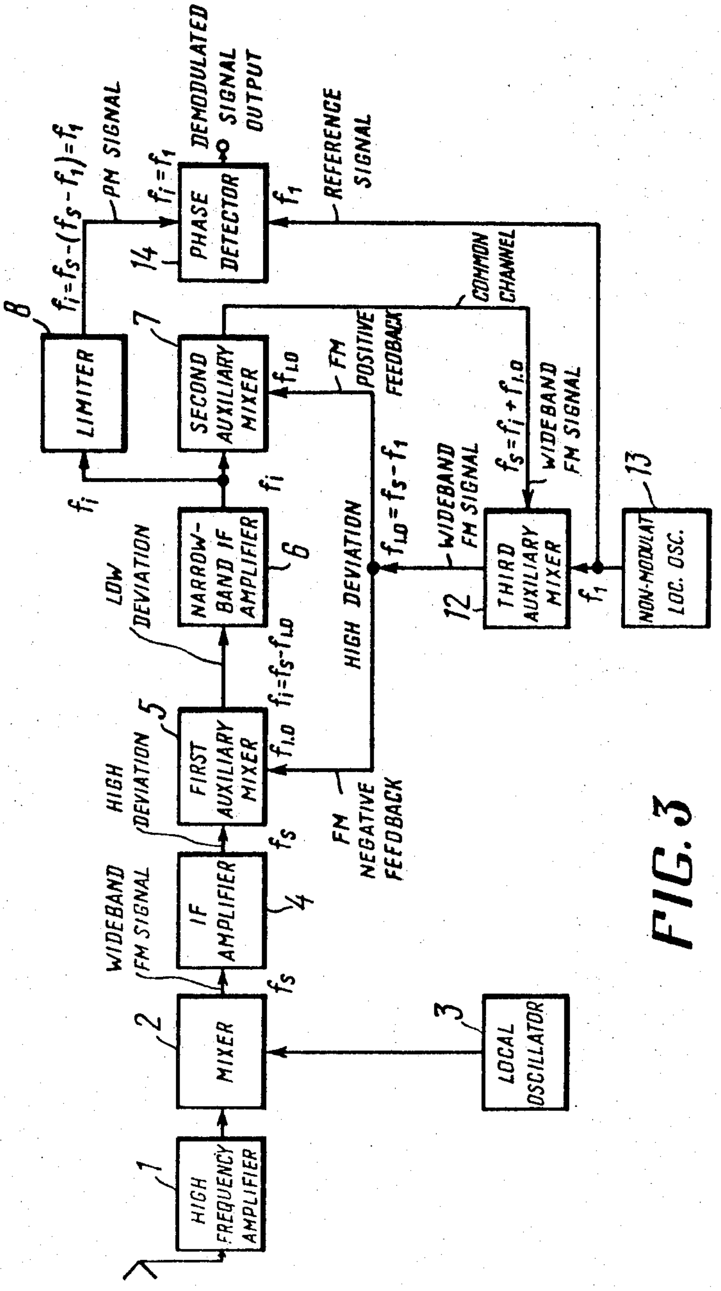
FIG. 3 is a block diagram of the frequency-modulated receiver with a phase detector at the output, according to the invention.

FIG. 3 shows a third embodiment of the invention in which the frequency-modulatad receiver is fitted with phase detector 14 connected to the outputs of narrow-band intermediate-frequency amplifier 6 and non-modulated local oscillator 13. This circuit operates on the following principle. Since the signal frequency deviation in narrow-band intermediate-frequency amplifier 6 increases with the increase of the modulating frequency, i.e. this signal is phase modulated with a constant phase shift for all the modulating frequencies, and moreover the carrier frequency of this signal coincides with the frequency of the signal coming from the non-modulated local oscillator, a demodulated signal is obtained at the phase detector output when a signal from the output of narrow-band intermediate-frequency amplifier 6 and that from the output of non-modulated local oscillator 13 are applied to the two inputs of phase detector 14.

The use of the phase detector additionally reduces the threshold level, due to the absence of noise pulses (clocks) which appear at the frequency discriminator output.

Although the invention has been described as embodied in a particular arrangement, it will be readily understood by those skilled in the art, that various modifications and changes can be made without departing in any way from the idea and scope of the invention.

These modifications and changes are to be comprehended within the spirit and scope of the present invention as act forth in the appended claims.

What is claimed is:

1. A frequency-modulated receiver with decreased threshold level comprising an intermediate-frequency amplifier, a demodulated signal amplifier, a first auxiliary mixer connected to the output of said intermediate-frequency amplifier, an auxiliary narrow-band intermediate-frequency amplifier connected to the output of the first auxiliary mixer; a second auxiliary mixer connected to the output of the auxiliary narrow-band intermediate-frequency amplifier; a limiter connected to the output of the second auxiliary mixer; a discriminator connected to the output of the limiter; and a frequency-modulated oscillator connected by its input to the output of the discriminator through the intermediary of said demodulated signal amplifier and by its output to the inputs of the first and second auxiliary mixers; an external negative feedback loop being formed from the output of the discriminator through the intermediary of the demodulated signal amplifier and the frequency-modulated oscillator to the input of the first auxiliary mixer and an internal positive feedback loop being formed from the output of the discriminator through the intermediary of the demodulated signal amplifier and the frequency-modulated oscillator to the input of the second auxiliary mixer, the external loop insuring negative feedback to decrease deviation of the frequency of the signal being received, the internal loop insuring positive feedback to recover the initial deviation of the frequency of said signal being received.

2. A frequency-modulated receiver with decreased threshold level comprising an intermediate-frequency amplifier, a first auxiliary mixer connected to the output of the intermediate-frequency amplifier; an auxiliary narrow-band intermediate-frequency amplifier connected to the output of the first auxiliary mixer; a second auxiliary mixer connected to the ouput of the auxiliary narrow-band intermediate-frequency amplifier; a limiter connected to the output of the second auxiliary mixer; a discriminator connected to the output of the limiter; a third auxiliary mixer connected by its input to said output of the second auxiliary mixer and by its output to the inputs of the first and second auxiliary mixers; a non-modulated oscillator connected by its output to the input of the third auxiliary mixer, an external negative feedback loop being formed from the output of the second auxiliary mixer through the intermediary of the third auxiliary mixer to the input of the first auxiliary mixer and an internal positive feedback loop being formed from the output of the second auxiliary mixer through the intermediary of the third auxiliary mixer to the input of the second auxiliary mixer, the external loop insuring negative feedback to decrease deviation of the frequency of the signal being received, the internal loop insuring positive feed back to recover the initial deviation of the frequency of said signal being received.

3. A frequency-modulated receiver with decreased threshold level comprising an intermediate-frequency amplifier, a first auxiliary mixer connected to the output of the intermediate-frequency amplifier; an auxiliary narrow-band intermediate-frequency amplifier connected to the output of the first auxiliary mixer; a second auxiliary mixer connected to the output of the auxiliary narrow-band intermediate-frequency amplifier; a limiter connected to the output of said auxiliary intermediate-frequency amplifier, a phase detector connected to the output of said limiter, a third auxiliary mixer connected by its input to said output of the second auxiliary mixer and by its output to the inputs of the first and second auxiliary mixers; a non-modulated oscillator connected by its output to the input of the third auxiliary mixer and to said phase detector, an external negative feedback loop being formed from the output of the second auxiliary mixer through the intermediary of the third auxiliary mixer to the input of the first auxiliary mixer and an internal positive feedback loop being formed from the output of the second auxiliary mixer through the intermediary of the third auxiliary mixer to the input of the second auxiliary mixer, the external loop insuring negative feedback to decrease deviation of the frequency of the signal being received, the internal loop insuring positive feedback to recover the initial deviation of the frequency of said signal being received.

References Cited

UNITED STATES PATENTS

| | | | |
|---|---|---|---|
| 3,001,068 | 9/1961 | Morita et al. | 325—346 |
| 3,069,625 | 12/1962 | Morita et al. | 325—349 |
| 3,210,667 | 10/1965 | Hern et al. | 325—345 |

ROBERT L. GRIFFIN, Primary Examiner

R. S. BELL, Assistant Examiner

U.S. Cl. X.R.

325—329, 351